ciates es Patent [19]

United States Patent [19]

Hendrickson et al.

[11] Patent Number: 5,021,783
[45] Date of Patent: Jun. 4, 1991

[54] METHOD FOR OPERATING AN APPARATUS FOR FACILITATING COMMUNICATIONS

[75] Inventors: Alan F. Hendrickson; Herbert M. Chen; Carlin D. Cabler; Rajiv Hattangadi, all of Austin, Tex.

[73] Assignee: Advanced Micro Devices, Inc., Sunnyvale, Calif.

[21] Appl. No.: 589,402

[22] Filed: Sep. 27, 1990

[51] Int. Cl.⁵ ............................................ H03M 1/00
[52] U.S. Cl. ................................. 341/110; 341/126; 341/142; 341/173
[58] Field of Search ............... 341/110, 126, 142, 173, 341/118, 144, 155, 50

[56] References Cited

U.S. PATENT DOCUMENTS

| 4,355,304 | 10/1982 | Kasuga et al. | 341/75 |
| 4,578,667 | 3/1986 | Hollister | 341/122 |
| 4,652,857 | 3/1987 | Meiksin | 341/110 X |
| 4,851,842 | 7/1989 | Iwamatsu | 341/139 |
| 4,958,139 | 9/1990 | Hyatt | 341/139 X |

Primary Examiner—A. D. Pellinen
Assistant Examiner—Sharon D. Logan
Attorney, Agent, or Firm—Foley & Lardner

[57] ABSTRACT

A method for operating an apparatus for facilitating communications between an analog device and a digital device, which apparatus includes a plurality of signal processing circuits and a control circuit for controlling the signal processing circuits. Each of the signal processing circuits includes signal attenuators and signal burst discrimination circuitry. The apparatus is operable in a plurality of stable states, preferably in an idle stable state, a transmit stable state, and a receive stable state. The apparatus also is operable in a plurality of transitional states, including up-transition states and down-transition states. The method includes the steps of evaluating each of the signal processing circuits by the signal burst discrimination circuitry, responding to detection of a burst indicator by setting a state indicator to an appropriate up-transition state, incrementally adjusting the attenuators in the signal processing circuits to enhance performance of the apparatus until the attenuators are at predetermined settings, periodically checking for presence of the burst indicator, on detection of cessation of the burst indicator, setting the state indicator to an appropriate down-transition state, incrementally adjusting the attenuators to redistribute attenuation losses among the signal processing circuits, if no burst indicator is detected, continuing such redistribution until the apparatus returns to the idle stable state.

2 Claims, 9 Drawing Sheets

FIG_8

FIG-9

METHOD FOR OPERATING AN APPARATUS FOR FACILITATING COMMUNICATIONS

CROSS REFERENCE TO RELATED APPLICATIONS

The following applications contain subject matter similar to the subject matter of this application.

U.S. patent application Ser. No. 07/589,330, filed on Sept. 27, 1990; entitled "Apparatus for Facilitating Communications"; and U.S. patent application Ser. No. 07/589,315, filed on Sept. 27, 1990; entitled "Apparatus for Discriminating Information Signals from Noise Signals in a Communication Signal".

BACKGROUND OF THE INVENTION

The present invention is directed to a method for operating an apparatus for facilitating communications. In particular, the present invention is directed to a method for operating an apparatus for facilitating communications between an analog device and a digital device, such as a hands-free speakerphone controller associated with a telephone system.

A significant portion of telephone equipment manufacturing costs may be attributable to parts and equipment assembly. One approach to reducing costs is to provide a low-cost part which requires no external components. Incorporation of external components into an integrated circuit generally yields a device which is more stable in its operation, has good sensitivity, and is consistent in its performance.

Additional advantages are realized when the integrated circuit is a digital circuit. Principal among such additional advantages are even further improved stability and programmability of various operational parameters associated with the apparatus. Digital programmability provides a versatile apparatus which may be easily tailored to be applicable to a wide variety of operational environments using a single integrated design. As a result, the development costs and manufacturing costs associated with the apparatus are much reduced since they are able to be spread across a wider variety of products.

The present invention is a method for operating a digital apparatus for facilitating communications between an analog device and a digital device, such as a hands-free controlled speakerphone apparatus associated with a digital telephone system. The method of the present invention provides for smooth incremental transition among a plurality of stable operating states of the apparatus.

SUMMARY OF THE INVENTION

The invention is a method for operating an apparatus for facilitating communications between an analog device and a digital device, which apparatus includes a plurality of signal processing circuits and a control circuit for controlling the signal processing circuits. Each of the signal processing circuits includes signal attenuators and the control circuit includes signal burst discrimination circuitry for discriminating utile signals, such as data- or speech-representative signals, from noise signals. The control circuit generates a burst indicator when a utile signal is detected.

The apparatus is operable in a plurality of stable states, one of the stable states being an idle state and others of the stable states being associated with respective of the signal processing circuits. Preferably, the apparatus operates in an idle stable state, a transmit stable state, and a receive stable state. The apparatus also is operable in a plurality of transitional states, which transitional states accommodate the apparatus changing among the stable states. The transitional states include a plurality of up-transition states and a plurality of down-transition states. Preferably there are a transmit-up transition state and a receive-up transition state, in which up-transition states the apparatus operates as it approaches its transmit stable state or receive stable state, respectively.

Further, preferably there are a transmit-down transition state and a receive-down transition state, in which down-transition (or, decay-transition) states the apparatus operates as it changes state from the transmit stable state or receive stable state, respectively.

The method of the present invention comprises the steps of (1) initially establishing the apparatus in the idle stable state; (2) evaluating each of the signal processing circuits by the signal burst discrimination circuitry; (3) responding to detection of a burst indicator during such evaluation by setting a state indicator to the respective of the up-transition states associated with respective of the stable states associated with respective of the signal processing circuits which occasioned the burst indicator; (4) incrementally adjusting the attenuators in the signal processing circuits to lessen attenuation losses in the respective of the signal processing circuits which occasioned the burst indicator and to increase attenuation losses in others of the signal processing circuits; (5) repeating step (4) until the attenuators are at predetermined settings, which predetermined settings are associated with respective of the stable states extant in the state indicator; (6) periodically checking for presence of the burst indicator; (7) on detection of cessation of the burst indicator, setting the state indicator to the respective of the down-transition states associated with the respective of the stable states extant in the state indicator; (8) incrementally adjusting the attenuators to redistribute attenuation losses among the signal processing circuits; (9) if no burst indicator is detected, continuing step (8) until the apparatus returns to the idle stable state, then performing steps (2)–(10); (10) if a burst indicator is detected, repeating steps (3)–(9).

It is, therefore, an object of the present invention to provide a method for operating an apparatus for facilitating communications between an analog device and a digital device which provides for smooth incremental transition among a plurality of stable operating states of the apparatus.

Further objects and features of the present invention will be apparent from the following specification and claims when considered in connection with the accompanying drawings illustrating the preferred embodiment of the invention.

DETAILED DESCRIPTION OF THE DRAWINGS

DETAILED DESCRIPTION OF THE INVENTION

Figure 1:
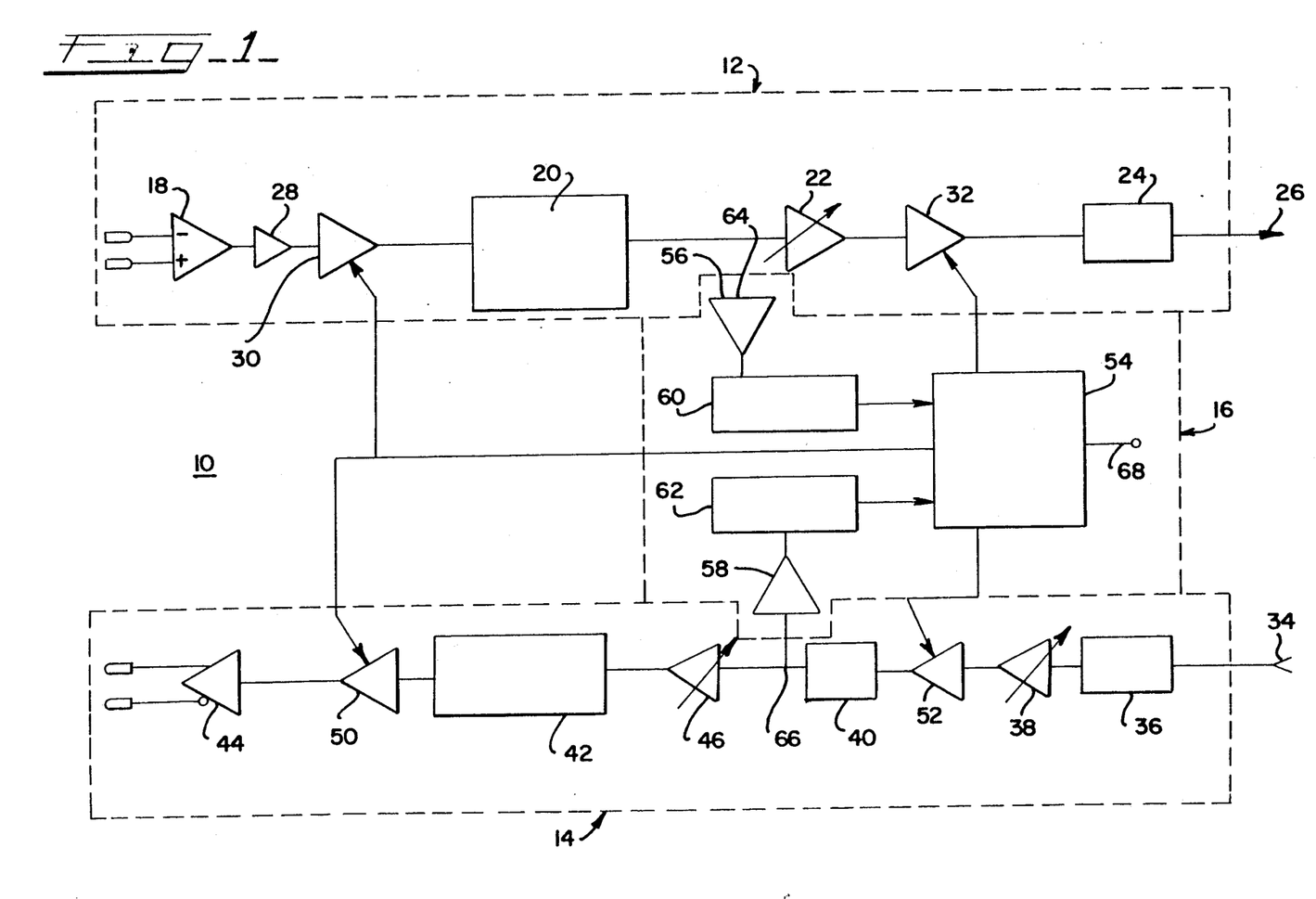
FIG. 1 is a schematic drawing of an apparatus appropriate for application of the method of the present invention.

FIG. 1 is a schematic diagram of an apparatus appropriate for application of the preferred embodiment of the present invention. In FIG. 1, an apparatus 10 for facilitating communications between an analog device (not shown) and a digital device (not shown) is illustrated.

Apparatus 10 includes a transmit circuit 12, a receive circuit 14, and a control circuit 16.

Transmit circuit 12 includes an analog input 18 from an analog device (not shown), such as a microphone or the like, an analog-to-digital conversion circuit 20, a programmable gain amplifier 22, and a compression circuit 24 for compressing digital signals prior to passing the digital outgoing signals to a digital device (not shown), such as a digital telephone circuit, at output 26. Also included in transmit circuit 12 are an analog attenuator 30 and a digital attenuator 32. A booster amplifier 28 is included before analog attenuator 30 to increase the signal-to-noise ratio of the outgoing signal before it is treated by analog attenuator 30 or analog-to-digital conversion circuit 20.

Receive circuit 14 receives digital signals from a digital device (not shown), such as a digital telephone network, at digital input 34. The received digital incoming signal is expanded by an expanding circuit 36 and is amplified by a programmable gain amplifier 38. Also included in receive circuit 14 is a limiter circuit 40 to limit excursion of the digital incoming signal, a digital-to-analog conversion circuit 42, and an analog output 44. Analog output 44 is connected to an analog output device (not shown), such as a loudspeaker, or the like. Also included in receive circuit 14 are an analog attenuator 50 and a digital attenuator 52.

Control circuit 16 includes a hands-free controller circuit 54, an amplifier 56, an amplifier 58, a transmit speech detector 60, and a receive speech detector 62. Thus, control circuit 16 samples outgoing digital signals at junction 64 and samples incoming digital signals at junction 66.

In operation, transmit circuit 12 accepts an outgoing signal as a differential analog input from a microphone (not shown) through analog input 18, performs analog-to-digital conversion of the outgoing signal by analog-to-digital conversion circuit 20, compresses the then-digital output signal by compression circuit 24, and presents the compressed digital output signal at digital output 26. The output signal also passes through analog attenuator 30 and digital attenuator 32, both of which are under control of hands-free controller circuit 54. Booster amplifier 28 boosts the outgoing analog signal level before analog-to-digital conversion circuit 20 performs its analog-to-digital conversion in order to improve conversion performance. Similarly, programmable gain amplifier 22 is placed in transmit circuit 12 before digital attenuator 32 in order that a user may adjust the final signal level of the outgoing digital signal, thereby further allowing for minimization of distortion and noise in the output digital signal produced at digital output 26.

Receive circuit 14 accepts compressed digital incoming signals at digital input 34, expands the incoming digital signal by expanding circuit 36, passes the incoming digital signal through limiter 40, and performs digital-to-analog conversion by digital-to-analog conversion circuit 42 in order to provide an incoming analog signal to a loudspeaker (not shown) through analog output 44. The incoming signals also pass through digital attenuator 52 and analog attenuator 50, both of which are controlled by hands-free controller circuit 54.

A programmable gain amplifier 38 and limiter 40 are placed before junction 66, the point at which incoming signals are sensed by control circuit 16, in order that hands-free controller circuit 54 can fairly compare outgoing transmit signals and incoming receive signal levels.

Programmable amplifier 46 is provided in order to compensate for loudspeaker sensitivity, which measures output loudness for a given electrical input. Programmable amplifier 46 is placed after junction 66, the sensing point for incoming signals for control circuit 16, so that programmable amplifier 46 does not affect one-to-one comparison by control circuit 16 of outgoing signals and incoming signals. Further, programmable gain amplifier 46 is placed before digital-to-analog conversion circuit 42 in order to optimize performance of digital-to-analog conversion circuit 42.

Transmit speech detector 60 samples signals from transmit circuit 12 and receive speech detector 62 samples signals from receive circuit 14. Amplifiers 56, 58 scale transmit signal levels and receive signal levels, respectively. Transmit speech detector 60 and receive speech detector 62 output to hands-free controller circuit 54 their respective scaled sampled transmit and receive signals. Additionally, transmit speech detector 60 and receive speech detector 62 provide to hands-free controller circuit 54 an indication of whether the respective sampled transmit and receive signals comprise a speech signal or a noise signal.

Signals of fairly constant amplitude over a 150 millisecond interval are generally presumed by the preferred embodiment of the present invention to be noise signals.

Hands-free controller circuit 54 accepts the respective scaled sampled transmit and receive signal level information, as well as speech or noise signal type indications, from transmit speech detector 60 and receive speech detector 62. Information thus received is used by hands-free controller circuit 54 to determine allocation of losses among the various attenuators 30, 32, 50, 52.

Hands-free controller circuit 54 provides three stable states and four transitional states of operation for the preferred embodiment of the present invention.

Preferably, the three stable states are idle, transmit, and receive; and the four transitional states are transmit-up, receive-up, transmit-down, and receive-down.

In the transmit stable state, analog attenuator 30 and digital attenuator 32 are forced to zero decibel loss, and analog attenuator 50 and digital attenuator 52 are forced to a programmable maximum loss. In such manner, hands-free controller circuit 54 allows the outgoing signal to pass through transmit circuit 12 without loss (theoretically), while any incoming signal received at digital input 34 is suppressed by subjecting it to a programmable maximum loss.

In the receive stable state, on the other hand, analog attenuator 50 and digital attenuator 52 are forced to zero decibel loss, and analog attenuator 30 and digital attenuator 32 are forced to a programmable maximum loss in order that losses may be distributed to the transmit circuit 12 while allowing (theoretical) loss-free passage of incoming signals through receive circuit 14.

In the idle stable state, each attenuator 30, 32, 50, 52 is forced to one-half the maximum programmable loss. In such a configuration, the apparatus is equally disposed to respond to transmit (outgoing) signals and to receive (incoming) signals.

Throughout operation of the preferred embodiment of the present invention, digital attenuators 32, 52 may be modified according to volume control values programmed in hands-free controller circuit 54.

The four transitional states established by hands-free controller circuit 54 are provided to ensure smooth transitions among the three stable states. During such transitions among the three stable states, losses in each attenuator 30, 32, 50, 52 are incremented or decremented appropriately to effect the correct transition, preferably in a series of 1.5 decibel steps, until a stable state is achieved by apparatus 10.

In the preferred embodiment of the present invention, the losses among the various attenuators 30, 32, 50, 52 are distributed according to several rules: first, losses in analog attenuator 30 and analog attenuator 50 always sum to a constant, which constant is the programmable maximum loss. Further, losses in digital attenuator 32 and digital attenuator 52 sum to the same constant. Such conditions guarantee stability during voice switching operations and assist in ensuring linear analog-to-digital conversion.

Second, at any given time, losses in analog attenuator 30 and digital attenuator 32 are the same and losses in analog attenuator 50 and digital attenuator 52 are the same. This second requirement allows hands-free controller circuit 54 to perform an unbiased comparison of transmit (outgoing) signal levels and receive (incoming) signal levels, thereby simplifying control circuitry within hands-free controller circuit 54.

Total loss control by hands-free controller circuit 54 in each of transmit circuit 12 and receive circuit 14 is split evenly between attenuators 30, 32 and attenuators 50, 52 for several reasons. First, such even distribution of losses allows a two point sensing structure by providing a reliably detectable signal level at junctions 64, 66 in a configuration which is easily stabilized. As an additional benefit, cost of manufacture also decreases because any requirement for additional sensing points is eliminated. Further, even distribution between attenuators 30, 32 and attenuators 50, 52 provides an automatic voice control hysteresis which defines the ability of a receive speaker to override a transmit speaker, and vice versa. Third, such even distribution helps prevent clipping distortion in the analog-to-digital conversion process as well as increases resolution of such conversion. Finally, such even distribution enhances stability of the idle state so that hands-free controller circuit 54 may make an unbiased comparisons of transmit (outgoing) signal levels and receive (incoming) signal levels.

A further advantage of the all-digital circuitry of apparatus 10 is a capability to provide an interface 68 with a microprocessor (not shown). Interface 68 provides access for microprocessor to automatically monitor the state of hands-free controller circuit 54 and provides access for a microprocessor to force hands-free controller circuit 54 to any given state by a register write to alter operational parameters utilized by hands-free controller circuit 54. It is precisely by such an access as may be provided by interface 68 that a microprocessor may be used to program operational parameters of a given apparatus 10 to adapt apparatus 10 to accommodate different operating environments. That is, change in applicability of apparatus 10 to accommodate different operating environments may be effected through using software to vary performance rather than by changing hardware. Indeed, such programmability allows operational parameters to be changed during the actual operation of a phone. Thus, alteration of operational parameters may, for example, enable the apparatus 10 to function as a normal full-duplex telephone, a simple transmitter, a simple receiver, or in its normal speakerphone function by employing software programming to change operational parameters.

Figure 2:
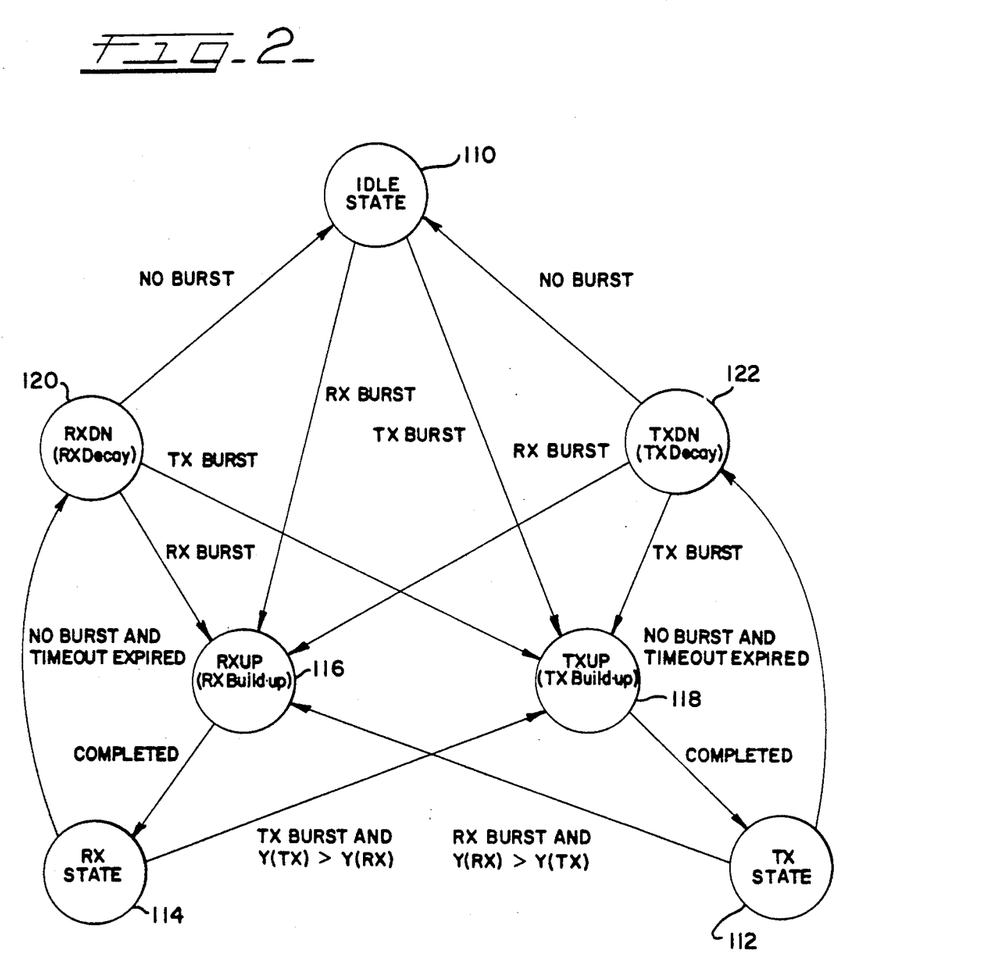
FIG. 2 is a state transition diagram for the preferred embodiment of the present invention.

FIG. 2 is a state transition diagram for the preferred embodiment of the present invention. In FIG. 2, three stable operational states are illustrated: idle state 110 (IDLE STATE), transmit state 112 (TX STATE), and receive state 114 (RX STATE). Also illustrated in FIG. 2 are four transitional operational states: receive-up state 116 (RXUP STATE), transmit-up state 118 (TXUP STATE), receive-down state 120 (RXDN STATE), and transmit-down state 122 (TXDN STATE).

In operation, when apparatus 10 of FIG. 1 is first powered up, it will be in IDLE STATE 110. Accordingly, for purposes of facilitating understanding of the present invention, this explanation of FIG. 2 will presume that apparatus 10 is initially in IDLE STATE 110. Apparatus 10 will remain in IDLE STATE 110 until, for example, a transmit burst (TX BURST) is detected, at which time the state will change from IDLE STATE 110 to TXUP STATE 118. In TXUP STATE 118 an incremental adjustment of attenuators, preferably in 1.5 decibel increments, is effected, as previously described in connection with FIG. 1, until predetermined attenuator parameter settings are achieved, at which time the transition by TXUP STATE 118 is completed and the state of apparatus 10 is changed to TX STATE 112. So long as the speaker who occasioned the detected TX BURST continues talking and is not interrupted, apparatus 10 will remain in TX STATE 112. If the speaker who occasioned the detected TX BURST is interrupted, that is if a receive burst (RX BURST) is detected and the signal level of the RX BURST exceeds the signal level of the TX BURST [Y(RX)>Y(TX)], then the state of apparatus 10 will change from TX STATE 112 to RXUP STATE 116 and an incremental adjustment of the various attenuators to achieve RX STATE 114 will be commenced. When the incremental adjustment by RXUP STATE 116 is complete, the state of apparatus 10 will change to RX STATE 114. If, however, when apparatus 10 is in TX STATE 112 the talker who occasioned the TX BURST initially detected is not interrupted but, instead, ceases talking, then, after expiration of a programmable timeout period, apparatus 10 assumes TXDN STATE 122. IN TXDN STATE 122 a decay by incremental adjustment of the various attenuators of apparatus 10 is effected; when the operational parameters of the attenuators of apparatus 10 are achieved corresponding to IDLE STATE 110, then the state of apparatus 10 changes to IDLE STATE 110. If a TX BURST or RX BURST is detected during the incremental decay adjustment of attenuator parameters, then the state of apparatus 10 will change to the appropriate transitional RXUP STATE 116 or TXUP STATE 118 to begin incremental adjustment of the attenuators to achieve the respective stable RX STATE 114 or TX STATE 112, as appropriate.

Similarly, if apparatus 10 is in IDLE STATE 110 and an RX BURST is detected, the state of apparatus 10 will change to RXUP STATE 116 to commence the incremental adjustment of attenuator parameters which, when achieved, will cause apparatus 10 to change state to RX STATE 114. If the speaker who occasioned the RX BURST which was detected is interrupted, that is there is a TX BURST and the transmit signal level is greater than the receive signal level [Y(TX)>Y(RX)], then the state of apparatus 10 will change to TXUP STATE 118 to begin incremental adjustment of attenuator parameters to achieve TX STATE 112. Also, if the speaker who occasioned the RX BURST which was detected ceases talking for longer than a preprogrammed timeout period, the decay process via RXDN STATE 120 will commence in a fashion similar to the previously-described operation in connection with TXDN STATE 122. The RXDN STATE 120 decay process may be interrupted by reception of a TX BURST or an RX BURST.

FIGS. 3 through 9 are flow diagrams representing the practice of the preferred embodiment of the present invention in the various states described in connection with FIG. 2. In FIGS. 3-9, circles represent entry and exit points for the flow chart routine, rectangles in the flow diagrams represent actions or operations completed, and other polygons in the flow diagrams represent conditional decisions effected by the method of the present invention. The notation X<--Y is intended to indicate that the value of Y, which may be a number or the contents of a register or a mathematical expression containing numbers and register contents, is moved into the register called X.

In the preferred embodiment of the present invention, each state is periodically evaluated, preferably with one state being evaluated during each 125 microsecond interval. Each such periodic evaluation begins in respective flow diagrams at the block marked "CALL" and ends at the block marked "RETURN".

Figure 3:
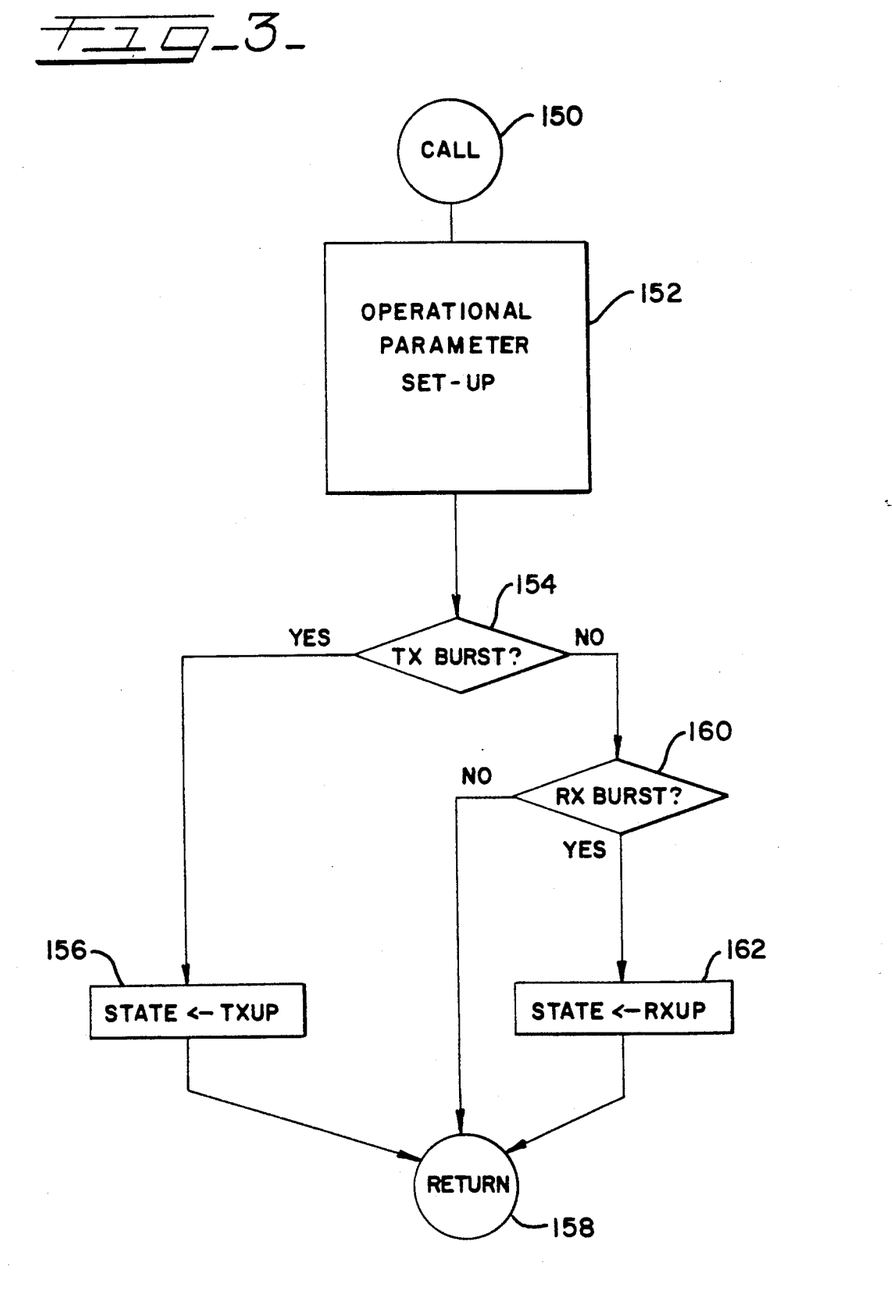
FIG. 3 is a flow diagram representing the practice of the preferred embodiment of the present invention in the idle stable state.

FIG. 3 is a flow diagram representing the practice of the preferred embodiment of the present invention in IDLE STATE. In FIG. 3, the portion of the preferred embodiment of the present invention associated with IDLE STATE is entered at block 150. Block 152 represents the setting of operational parameters for various aspects of apparatus 10, such as attenuator parameters and speech detector sensitivity parameters. A query is posed at block 154 whether a TX BURST has been detected. Such information is available from transmit speech detector 60 via hands-free controller circuit 54 (see FIG. 1).

If a TX BURST is detected, then the "yes" branch is taken from block 154 and the state of apparatus 10 changes to the TXUP STATE at block 156. Subsequently, the portion of the method of the present invention associated with the IDLE STATE is exited at block 158.

If there is no TX BURST detected, then the "no" branch is taken from block 154 and a query is posed at block 160 whether a receive burst (RX BURST) has been detected. Such information is available from receive speech detector 62 via hands-free controller circuit 54 (see FIG. 1).

If an RX BURST has been detected, then the "yes" branch is taken from block 160, whereupon the state of apparatus 10 is set to the RXUP STATE at block 162, and the portion of the method associated with the IDLE STATE is exited at block 158. If no RX BURST is detected, then the "no" branch is taken from block 160 and the portion of the method associated with the IDLE STATE is exited at block 158.

Figure 4:
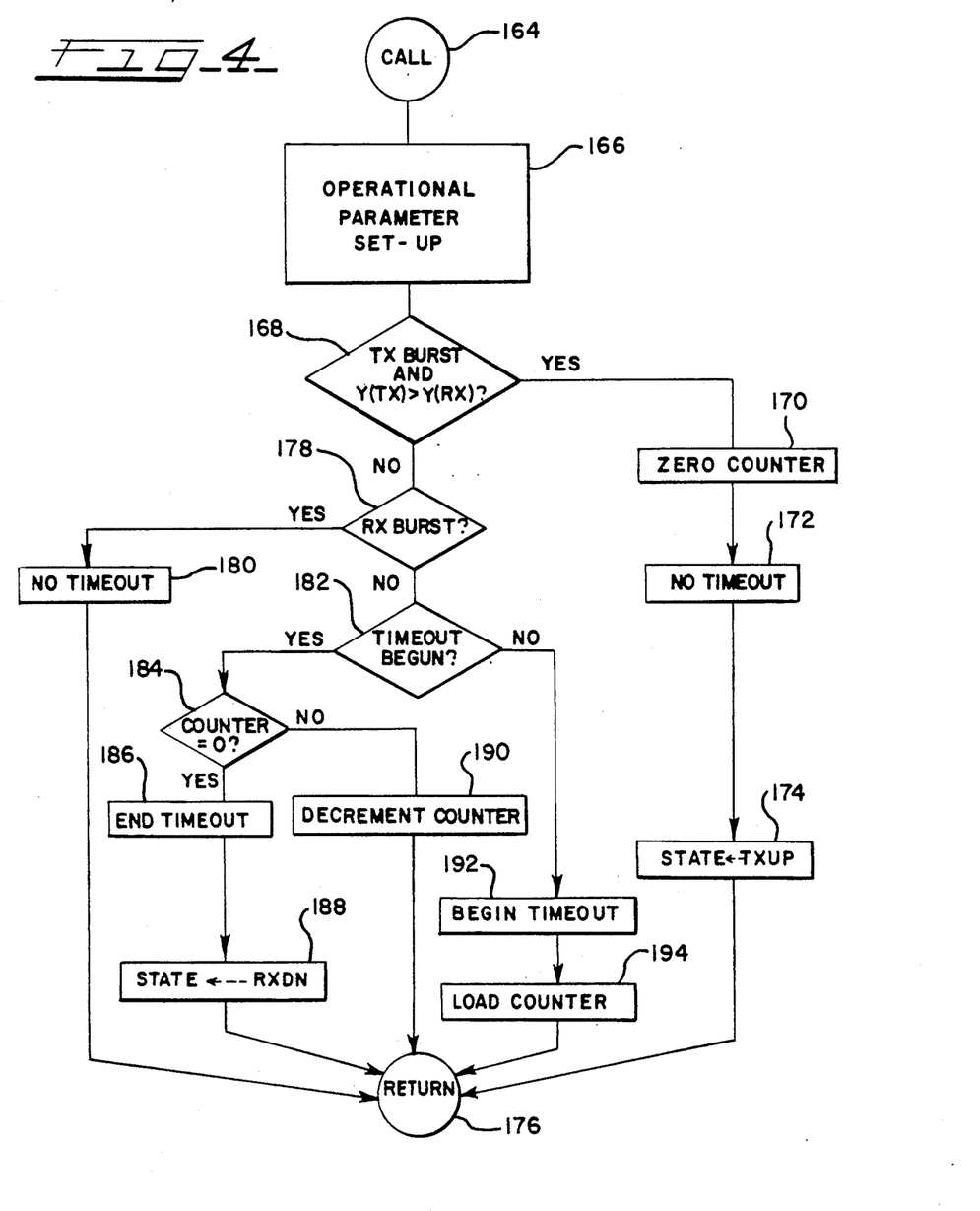
FIG. 4 is a flow diagram representing the practice of the preferred embodiment of the present invention in the receive stable state.

FIG. 4 is a flow diagram representing the practice of the preferred embodiment of the present invention in the RECEIVE STATE. In FIG. 4, the portion of the method associated with the RECEIVE STATE (RX STATE) is entered at block 164 and operational parameters are initialized (e.g., speech detector sensitivity parameters and attenuator operational parameters) in block 166. A query is posed at block 168 whether a transmit burst (TX BURST) has been received and whether the transmit signal level is greater than the receive signal level [Y(TX)>Y(RX)]. If both conditions are satisfied, then the "yes" branch is taken from block 168.

Blocks 170 and 172 effect a negation of any pre-existing timeout counter operation of timeout status which may have existed in the system (the timeout function is a delay incorporated in the decay aspect discussed hereinabove in connection with FIG. 2). And, by block 174 the state of apparatus 10 is set to the TXUP STATE, after which the portion of the method associated with the RX STATE is exited at block 176. If both conditions posed by the query of block 168 are not satisfied, the "no" branch is taken from block 168 and a query is posed by block 178 whether a receive burst (RX BURST) is detected. If an RX BURST is detected, then the "yes" branch is taken from block 178, a "No Timeout" flag is set by block 180, and the portion of the method associated with the RECEIVE STATE is exited at block 176. If no RX BURST is detected, then the "no" branch is taken from block 178 and a query is posed at block 182 whether the timeout period has been begun. If the timeout period has been begun, the "yes" branch is taken from block 182 and a query is posed at block 184 whether the counter associated with the timeout function has reached zero (i.e., has the preprogrammed timeout period expired). If the counter associated with the timeout function has reached zero, then the "yes" branch is taken from block 184 and, according to block 186, the timeout function is ended. The state of apparatus 10 is changed to the receive-down state (RXDN) by block 188 and the portion of the method associated with the RECEIVE STATE is exited at block 176.

If the counter associated with the timeout function has not reached zero (i.e., the preprogrammed timeout period has not elapsed) then, according to block 190, the counter is decremented and, thereafter, the portion of the method associated with the RECEIVE STATE is exited at block 176.

If the timeout period has not begun, the "no" branch is taken from block 182, a timeout function is begun according to block 192, and the counter associated with the timeout function is loaded according to block 194. Thereafter, the portion of the method associated with the RECEIVE STATE is exited at block 176.

Figure 5:
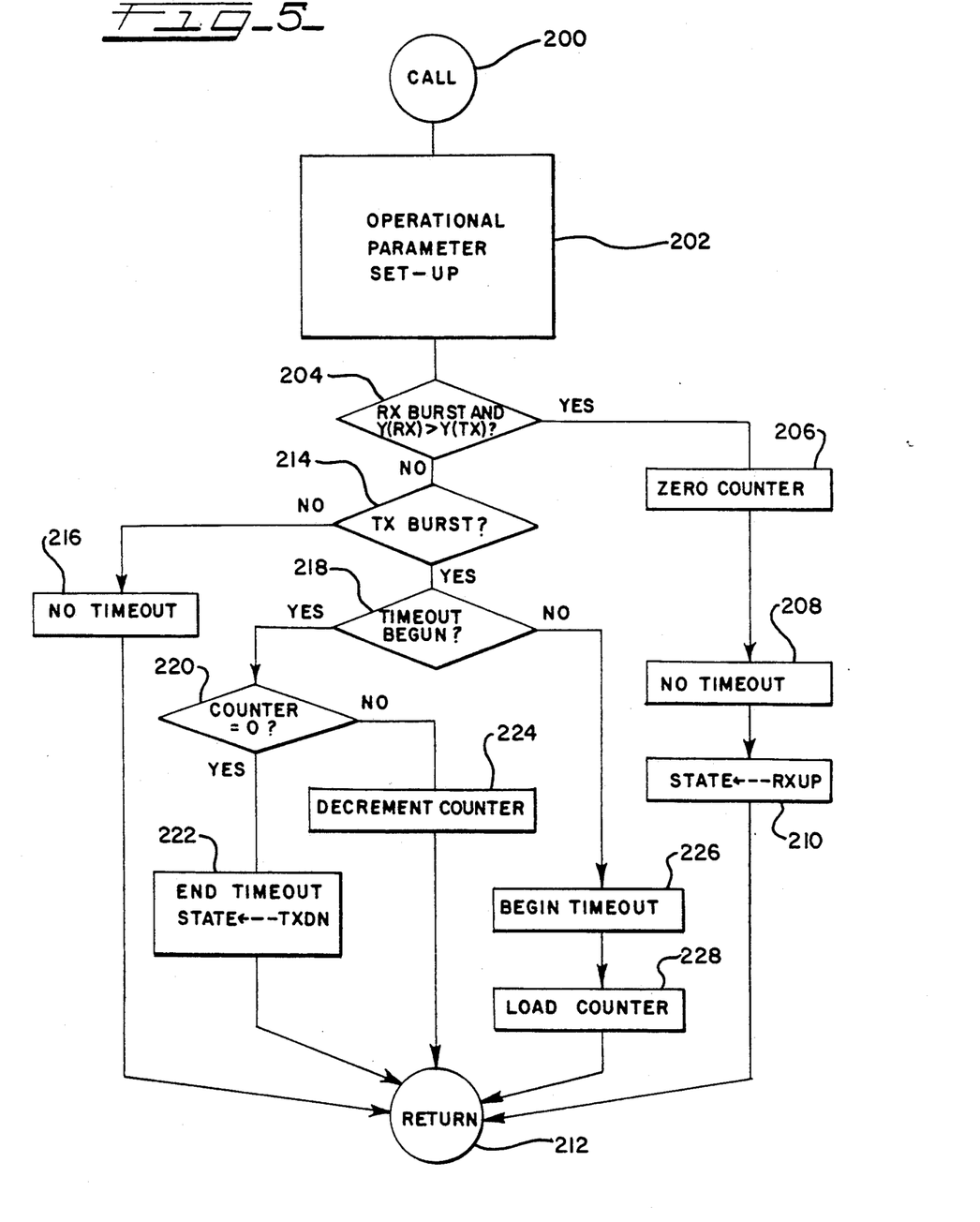
FIG. 5 is a flow diagram representing the practice of the preferred embodiment of the present invention in the transmit stable state.

FIG. 5 is a flow diagram representing the practice of the preferred embodiment of the present invention in the TRANSMIT STATE (TX STATE). In FIG. 5, the portion of the method associated with the TX STATE is entered at block 200. Operational parameters, such as attenuator operating parameters and speech detector sensitivity parameters, are set at block 202 and a query is posed at block 204 whether a receive burst (RX BURST) has been detected and whether the signal level of the receive signal is greater than the signal level of the transmit signal [Y(RX)>Y(TX)]. If both conditions of the query posed at block 204 are satisfied, then the "yes" branch from block 204 is taken and the counter associated with the timeout function (the timeout function is associated with decay from a stable state (as discussed in connection with FIG. 2)) is zeroed at block 206, a "no timeout" flag for apparatus 10 is set at block 208, and the state of apparatus 10 is set at RXUP STATE at block 210. The portion of the method associated with the TX STATE is exited at block 212.

If both conditions of the query posed at block 204 are not satisfied, then the "no" branch is taken from block 204 and a query is posed at block 214 whether a transmit burst (TX BURST) has been detected. If no TX BURST has been detected, then the "no" branch is taken from block 214, a "no timeout" flag for apparatus 10 is set at block 216, and the portion of the method associated with the TX STATE is exited at block 212.

If, however, a TX BURST has been detected, then the "yes" branch is taken from block 214 and a query is posed at block 218 whether the timeout interval has begun. If the timeout interval has begun, the "yes" branch is taken from block 218 and a query is posed at block 220 whether the counter associated with the timeout interval has reached zero, indicating that the timeout interval has elapsed. If the timeout interval has elapsed, then the "yes" branch is taken from block 220, and, according to block 222, the timeout period is ended and the state of apparatus 10 is set to the transmit down state (TXDN). Subsequently, the portion of the method associated with the TRANSMIT STATE is exited at block 212. If the timeout interval has not elapsed, then the "no" branch is taken from block 220, the counter is decremented at block 224, and the portion of the method associated with the TRANSMIT STATE is exited at block 212.

If the timeout period had not begun at the time of the query posed at block 218, then the "no" branch is taken from block 218, the timeout period is begun according to block 226, the counter is loaded at block 228 in order to define the timeout interval, and the portion of the method associated with the TRANSMIT STATE is exited at block 212.

Figure 6:
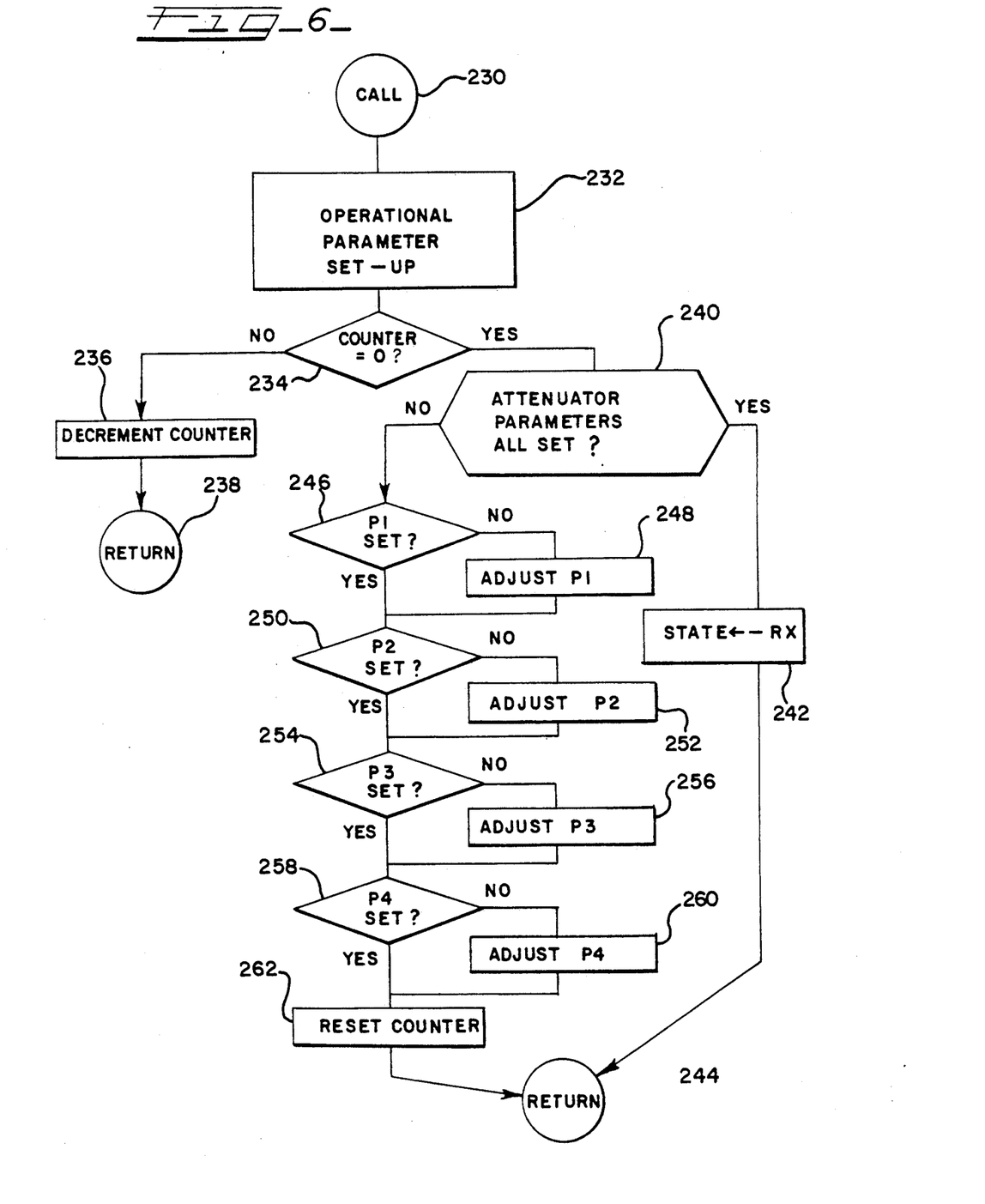
FIG. 6 is a flow diagram representing the practice of the preferred embodiment of the present invention in the receive-up transitional state.

FIG. 6 is a flow diagram representing the practice of the preferred embodiment of the present invention in a receive-up (RXUP) transitional state. In FIG. 6, the portion of the method practiced in connection with the RXUP STATE is entered at block 230 and certain operational parameters associated with the RXUP STATE (such as endpoints of attenuator parameter adjustments) are established at block 232. A query is posed at block 234 whether the counter associated with delays attending adjustments of attenuator operational parameters is at zero, indicating that the preprogrammed interval imposed between attenuator parameter adjustments has expired.

If the required interval has not expired, then the "no" branch is taken from block 234, the counter is decremented at block 236 and the portion of the method associated with the RXUP STATE is exited at block 238.

If the preprogrammed interval between attenuator parameter adjustments has expired, then the "yes" branch is taken from block 234 and a query is posed at block 240 whether all attenuator parameters are set at their appropriate endpoints (which had been established at block 232) for the RX STATE. If all of the attenuator parameters have been properly set for the RX STATE, then the state of apparatus 10 is changed at block 242 to the RX STATE and the portion of the method associated with the RXUP STATE is exited at block 244.

If all attenuator parameters have not been appropriately set for the RX STATE, then the "no" branch is taken from block 240. A query whether the first attenuator parameter P1 is set appropriately for the RX STATE is posed at block 246 and, if not, the "no" branch is taken from block 246 so that the attenuator parameter P1 is incrementally adjusted appropriately according to block 248. A query is then posed whether the attenuator parameter P2 is properly set for the RX STATE at block 250 and, if not, the "no" branch is taken from block 250 to effect incremental adjustment of the attenuator parameter P2 according to block 252. A query as to whether the attenuator parameter P3 is appropriately set for the RX STATE is posed at block 254 and, if not, the "no" branch is taken from block 254 to effect incremental adjustment of the attenuator parameter P3 according to block 256. Finally, a query as to whether attenuator parameter P4 has been appropriately set for the RX STATE is posed at block 258 and, if not, the "no" branch is taken from block 258 to effect incremental adjustment of attenuator parameter P4 according to block 260. After it has been ascertained that either all four of the attenuator parameters P1, P2, P3, P4 have been correctly set for the RX STATE or an incremental adjustment has been effected for those attenuator parameters not properly set, the counter associated with the required interval between attenuator parameter adjustments is reset at block 262 and the portion of the method associated with the RXUP STATE is exited at block 244.

Figure 7:
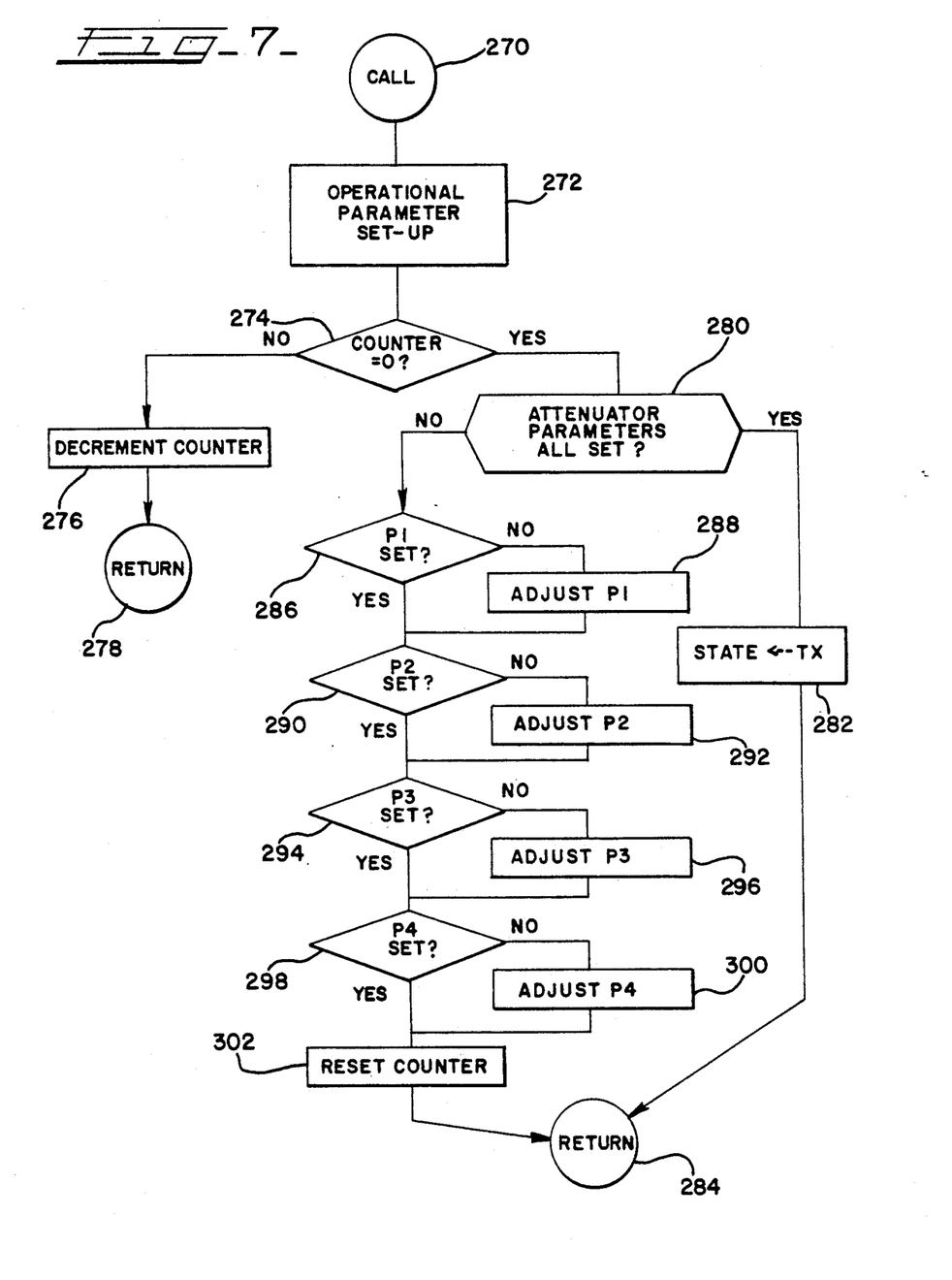
FIG. 7 is a flow diagram representing the practice of the preferred embodiment of the present invention in the transmit-up transitional state.

FIG. 7 is a flow diagram representing the practice of the preferred embodiment of the present invention in the transmit-up (TXUP) transitional state. In FIG. 7, the portion of the method of the present invention associated with the TXUP STATE is entered at block 270 and operational parameters, such as the endpoints of the adjustments for the attenuators of apparatus 10 are set up at block 272. A query is posed at block 274 whether the counter associated with the programmable required interval between attenuator parameter adjustments is zero, indicating that the required interval has expired. If the required interval has not expired, the "no" branch is taken from block 274, the counter is decremented according to block 276, and the portion of the method of the present invention associated with the TXUP STATE is exited at block 278. If the required interval between attenuator parameter adjustments has expired, then the "yes" branch is taken from block 274 and a query is posed at block 280 whether all attenuator parameters have been set appropriately for the TX STATE. If all attenuator parameters have been appropriately set for the TX STATE, then the "yes" branch is taken from block 280, apparatus 10 is set at the TX STATE at block 282 and the portion of the method associated with the TXUP STATE is exited at block 284. If, however, not all attenuator parameters have been appropriately set for the TX STATE, the "no" branch is taken from block 280 and a query is posed whether attenuator parameter P1 is appropriately set for the TX STATE at block 286. If the attenuator parameter P1 is not appropriately set, then the "no" branch is taken from block 286 and attenuator parameter P1 is incrementally adjusted according to block 288. A query is posed at block 290 whether attenuator parameter P2 is set appropriately for the TX STATE and, if not, the "no" branch is taken from block 290 and attenuator parameter P2 is adjusted according to block 292. Whether attenuator parameter P3 is appropriately set for the TX STATE is posed as a query by block 294 and, if not, the "no" branch is taken from block 294, and attenuator parameter P3 is incrementally adjusted at block 296. Finally, a query is posed at block 298 whether attenuator parameter P4 is appropriately set for the TX STATE and if not, the "no" branch is taken from block 298 and attenuator parameter P4 is incrementally adjusted at block 300. After all attenuator parameters P1, P2, P3, P4 have either been determined correctly set for the TX STATE or incrementally adjusted, the counter associated with the required interval between attenuator parameter adjustments is reset at block 302 and the portion of the method associated with the TXUP STATE is exited at block 284.

Figure 8:
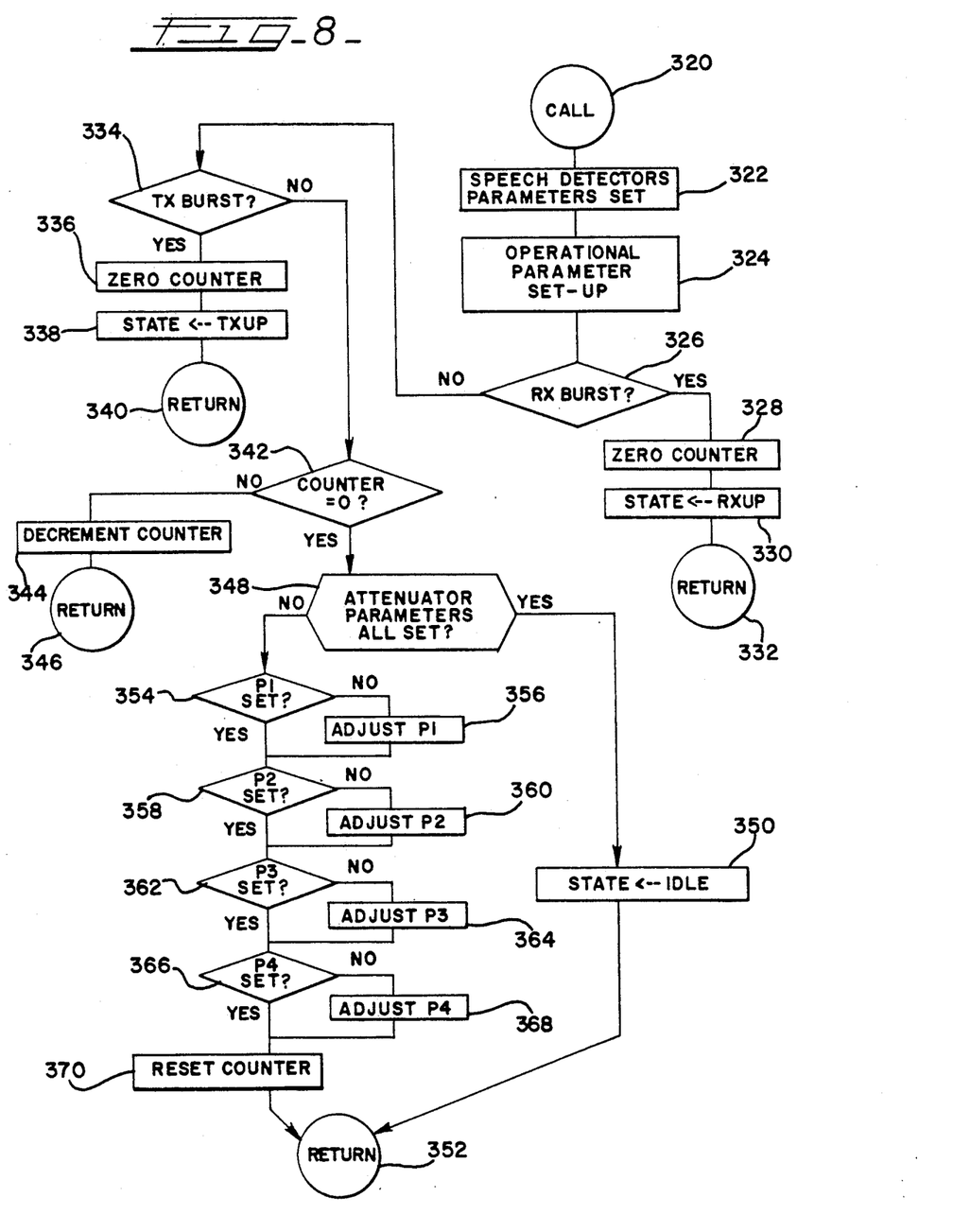
FIG. 8 is a flow diagram representing the practice of the preferred embodiment of the present invention in the receive-down transitional state.

FIG. 8 is a flow diagram representing the practice of the preferred embodiment of the present invention in the receive-down (RXDN) transitional state. In FIG. 8, the portion of the present invention associated with the RXDN STATE is entered at block 320. Operational parameters associated with the speech detectors are set at block 322 and other operational parameters such as the desired attenuator endpoint values for the RXUP STATE are set at block 324. A query is posed at block 326 whether an RX BURST has been detected. If an RX BURST has been detected, the "yes" branch is taken from block 326, the counter associated with the programmable interval between attenuator parameter adjustments is set to zero at block 328, and apparatus 10 is set at the RXUP STATE at block 330. Subsequently, the portion of the present invention associated with the RXDN STATE is exited at block 332. If no RX BURST is detected, the "no" branch is taken from block 326 and a query is posed at block 334 whether a transmit burst (TX BURST) is detected. If a TX BURST is detected, the "yes" branch is taken from block 334 and the counter associated with the interval between adjustments of attenuator parameters is zeroed at block 336. The state of apparatus 10 is set at the TXUP STATE at block 338 and the portion of the present invention associated with the RXDN STATE is exited at block 340.

If no TX BURST is detected, the "no" branch is taken from block 334 and a query is posed at block 342 whether the counter associated with the interval between attenuator parameter adjustments is zero, i.e., whether the required interval has elapsed. If the required interval has not elapsed, the "no" branch is taken from block 342, the counter is decremented at block 344, and the portion of the present invention associated with the RXDN STATE is exited at block 346. If the required interval between attenuator parameter adjustments has elapsed, the "yes" branch is taken from block 342 and a query is posed at block 348 whether all attenuator parameters are set appropriately for the IDLE STATE. If all attenuator parameters are so appropriately set for the IDLE STATE, the "yes" branch is taken from block 348, apparatus 10 is set at the IDLE STATE at block 350, and the portion of the present invention associated with the RXDN STATE is exited at block 352.

If not all attenuator parameters are appropriately set for the IDLE STATE, the "no" branch is taken from block 348 and a query is posed whether attenuator parameter P1 is appropriately set for the IDLE STATE at block 354. If the attenuator parameter P1 is not appropriately set, the "no" branch is taken from block 354 and attenuator parameter P1 is incrementally adjusted at block 356. A query is posed at block 358 whether attenuator parameter P2 is appropriately set for the IDLE STATE and, if not, the "no" branch is taken from block 358 and attenuator parameter P2 is incrementally adjusted at block 360. A query is posed at block 362 whether attenuator parameter P3 is appropriately set for the IDLE STATE at block 362 and, if not, the "no" branch is taken from block 362 and attenuator parameter P3 is incrementally adjusted at block 364. Finally, a query is posed at block 366 whether attenuator parameter P4 is appropriately set for the IDLE STATE and, if not, the "no" branch is taken from block 366 and attenuator parameter P4 is incrementally adjusted at block 368. Once all attenuator parameters P1, P2, P3, P4 have either been determined to be appropriately set for the IDLE STATE or have been incrementally adjusted, the counter associated with the required interval between attenuator parameter adjustments is reset at block 370 and the portion of the method associated with the RXDN STATE is exited at block 352.

Figure 9:
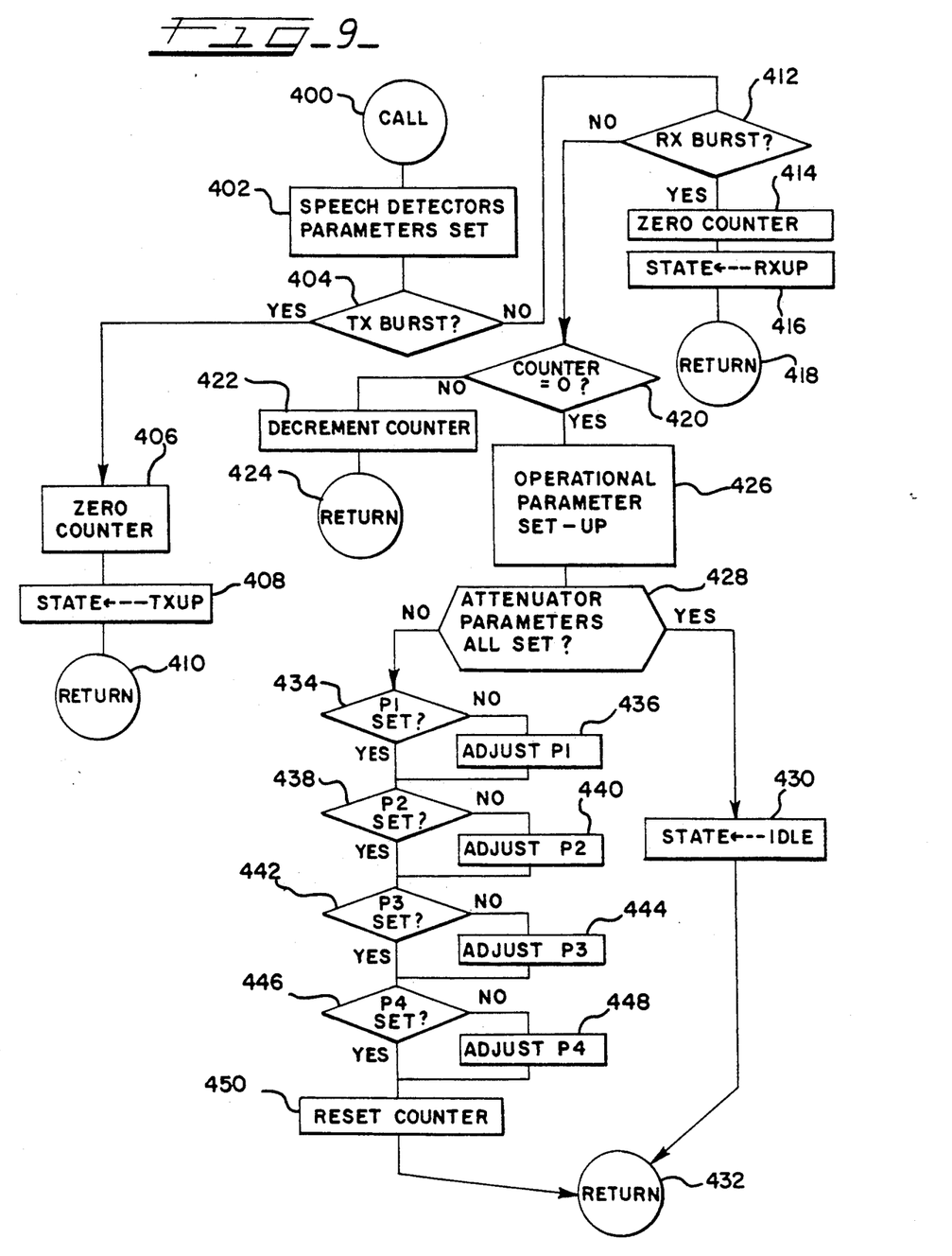
FIG. 9 is a flow diagram representing the practice of the preferred embodiment of the present invention in the transmit-down transitional state.

FIG. 9 is a flow diagram representing the practice of the preferred embodiment of the present invention in the transmit-down (TXDN) transitional state. In FIG. 9, the portion of the present invention associated with the TXDN STATE is entered at block 400 and operational parameters associated with the speech detectors are set at block 402. A query is posed at block 404 whether a TX BURST has been detected. If a TX BURST has been detected, the "yes" branch is taken from block 404 and the counter associated with the programmable interval required between attenuator parameter adjustments is zeroed at block 406. The state of apparatus 10 is set at the TXUP STATE at block 408 and the portion of the present invention associated with the TXDN STATE is exited at block 410. If a TX BURST is detected, the "no" branch is taken from block 404 and a query is posed at block 412 whether an RX BURST has been detected. If an RX BURST has been detected, the "yes" branch is taken from block 412, the counter associated with the programmable interval between attenuator parameter adjustments is zeroed at block 414, apparatus 10 is set in the RXUP STATE at block 416, and the portion of the present invention associated with the TXDN STATE is exited at block 418.

If no RX BURST is detected, then the "no" branch is taken from block 412 and a query is posed at block 420 whether the counter associated with the programmable interval between attenuator parameter adjustments is zero, i.e., whether the interval has elapsed. If the interval has not elapsed, the "no" branch is taken from block 420, the counter associated with the interval between attenuator parameter adjustments is decremented at block 422, and the portion of the present invention associated with the TXDN STATE is exited at block 424.

If the programmed interval between attenuator parameter adjustments has elapsed, the "yes" branch is taken from block 420, operational parameters associated with the attenuators, i.e., the parameter values appropriate to the IDLE STATE are set up in block 426 and a query is posed a block 428 whether all attenuator parameters are appropriately set for the IDLE STATE. If all attenuator parameter values are appropriately set for the IDLE STATE, the "yes" branch is taken from block 428, apparatus 10 is set at the IDLE STATE at block 430, and the method of the present invention associated with the TXDN STATE is exited at block 432.

If the attenuator parameters are not all set appropriately for the IDLE STATE, the "no" branch is taken from block 428 and a query is posed at block 434 whether attenuator parameter P1 is appropriately set for the IDLE STATE and, if not, the "no" branch is taken from block 434 and attenuator parameter P1 is incrementally adjusted at block 436. A query is posed at block 438 whether attenuator parameter P2 is appropriately set for the IDLE STATE and, if not, the "no" branch is taken from block 438 and attenuator parameter P2 is incrementally adjusted at block 440. A query is posed at block 442 whether attenuator parameter P3 is appropriately set for the IDLE STATE and, if not, the "no" branch is taken from block 442 and attenuator parameter P3 is incrementally adjusted at block 444. Finally, a query is posed at block 446 whether attenuator parameter P4 is appropriately set for the IDLE STATE and, if not, the "no" branch is taken from block 446 and attenuator parameter P4 is incrementally adjusted at block 448. After each of the attenuator parameters P1, P2, P3, P4 have been either determined to be appropriately set for the IDLE STATE or have been incrementally adjusted, the counter associated with the programmed interval between attenuator parameter adjustments is reset at block 450 and, subsequently, the portion of the method associated with the TXDN STATE is exited at block 432.

It is to be understood that, while the detailed drawings and specific examples given describe preferred embodiments of the invention, they are for the purpose of illustration only, that the apparatus of the invention is not limited to the precise details and conditions disclosed and that various changes may be made therein without departing from the spirit of the invention which is defined by the following claims:

We claim:

1. A method for operating an apparatus for facilitating communications between an analog device and a digital device, said apparatus including a plurality of circuit means for processing signals and a control means for controlling said plurality of circuit means; each of said plurality of circuit means including attenuator means for attenuating signals; said control means including signal burst discrimination means for discriminating utile signals from noise signals, said control means generating a burst indicator when a utile signal is detected; said apparatus being operable in a plurality of stable states, one of said plurality of stable states being an idle state and others of said plurality of stable states being associated with respective ones of said plurality of circuit means; said apparatus also being operable in a plurality of transitional states, said plurality of transitional states accommodating said apparatus changing among said plurality of stable states; said plurality of transitional states including a plurality of up-transition states and a plurality of down-transition states; the method comprising the steps of:

(1) initially establishing said apparatus in said idle state;

(2) evaluating each of said plurality of circuit means by said signal burst discrimination means;

(3) responding to detection of said burst indicator during said evaluation by setting a state indicator to the respective ones of said plurality of up-transition states associated with the respective ones of said plurality of stable states associated with the respective ones of said plurality of circuit means which occasioned said burst indicator;

(4) incrementally adjusting said attenuator means in said plurality of circuit means to lessen attenuation losses in the respective ones of said plurality of circuit means which occasioned said burst indicator and to increase attenuation losses in others of said plurality of circuit means;

(5) repeating step (4) until said attenuator means are at predetermined settings, said predetermined settings being associated with said respective ones of said plurality of stable states extant in said state indicator;

(6) periodically checking for presence of said burst indicator;

(7) on detection of cessation of said burst indicator, setting said state indicator to the respective ones of said plurality of down-transition states associated with the respective ones of said plurality of stable states extant in said state indicator;

(8) incrementally adjusting said attenuator means to redistribute attenuation losses among said plurality of circuit means;

(9) if no burst indicator is detected, continuing step (8) until said apparatus returns to said idle state, then performing steps (2)–(10);

(10) if a burst indicator is detected, repeating steps (3)–(9).

2. A method for operating an apparatus for facilitating communications between an analog device and a digital device as recited in claim 1 wherein step (7) further includes delaying for a predetermined time after said detection of cessation of said burst indicator and before said setting said state indicator.

* * * * *